US012709256B2

(12) United States Patent
Zhang

(10) Patent No.: US 12,709,256 B2
(45) Date of Patent: Aug. 18, 2026

(54) METHOD AND APPARATUS FOR BRAKING A VEHICLE USING A REDUNDANT BRAKING SYSTEM

(71) Applicant: Robert Bosch GmbH, Stuttgart (DE)

(72) Inventor: Yin Zhang, Suzhou (CN)

(73) Assignee: Robert Bosch GmbH, Stuttgart (DE)

( * ) Notice: Subject to any disclaimer, the term of this patent is extended or adjusted under 35 U.S.C. 154(b) by 135 days.

(21) Appl. No.: 18/768,935

(22) Filed: Jul. 10, 2024

(65) Prior Publication Data

US 2025/0026328 A1 Jan. 23, 2025

(30) Foreign Application Priority Data

Jul. 21, 2023 (CN) ........................ 202310900423.8

(51) Int. Cl.
*B60T 8/96* (2006.01)
*B60T 8/171* (2006.01)
*B60T 8/172* (2006.01)

(52) U.S. Cl.
CPC ................ *B60T 8/96* (2013.01); *B60T 8/171* (2013.01); *B60T 8/172* (2013.01); *B60T 2240/00* (2013.01); *B60T 2250/04* (2013.01); *B60T 2270/402* (2013.01); *B60T 2270/413* (2013.01); *B60T 2270/416* (2013.01)

(58) Field of Classification Search
CPC . B60T 8/96; B60T 8/171; B60T 8/172; B60T 2240/00; B60T 2250/04; B60T 2270/402; B60T 2270/413; B60T 2270/416; B60T 8/885; B60T 17/18; B60T 8/88; B60T 2260/04
See application file for complete search history.

(56) References Cited

U.S. PATENT DOCUMENTS

2022/0041058 A1* 2/2022 Nemeth ................ B60W 10/20
2023/0115299 A1* 4/2023 Freund ............. B60W 50/0205 701/70
2023/0119249 A1* 4/2023 LaBarbera ........... B60W 10/04 477/107

* cited by examiner

*Primary Examiner* — Sizo B Vilakazi
(74) *Attorney, Agent, or Firm* — Maginot, Moore & Beck LLP

(57) ABSTRACT

A method for braking a vehicle through a redundant braking system includes (i) in response to a fault signal received from the main braking system of the vehicle, obtaining the motor speed, (ii) calculating the wheel speed of the vehicle based on the motor speed, and (iii) generating a braking command based on the wheel speed to control the braking actuators of the vehicle to brake the wheels.

7 Claims, 5 Drawing Sheets

METHOD AND APPARATUS FOR BRAKING A VEHICLE USING A REDUNDANT BRAKING SYSTEM

This application claims priority under 35 U.S.C. § 119 to patent application no. CN 2023 1090 0423.8, filed on Jul. 21, 2023 in China, the disclosure of which is incorporated herein by reference in its entirety.

The present disclosure relates generally to the field of vehicle braking and, more specifically, to a method and apparatus for braking a vehicle using a redundant braking system.

BACKGROUND

At present, more and more vehicles on the market, especially electric or hybrid vehicles, are adopting braking systems that combine main and redundant systems. This ensures that in case of main system failure, the redundant braking system can still provide the required braking capability, thereby ensuring safe driving and improving the driving and riding experience. The role of redundant brake systems is particularly critical in autonomous vehicles. According to the classification standards for automated driving, when automated vehicles operate at L3 and above, reliance on driver intervention for vehicle control cannot be expected. Instead, the vehicle control system is responsible for the safe operation of the vehicle. In such scenarios, the introduction of a redundant braking system ensures that loss of control over the vehicle's braking capability due to main braking system failure is prevented. For braking systems, including both the main braking system and redundant control systems, the wheel speed is a crucial parameter essential for effective braking operation. The wheel speed is typically provided by wheel speed sensors (WSS) attached to the wheels, which transmit this information to the main braking system. This allows the main braking system to control the magnitude of braking force applied to the wheels based on the wheel speed. However, there may exist failure scenarios like this: The main braking system failure prevents accurate braking control, and simultaneously, the inability to transmit wheel speed data provided by the wheel speed sensors to the redundant braking system results in the redundant system being unable to act as a substitute for the main braking system to fulfill braking functions. Furthermore, the wheel speed sensor itself may also malfunction, thereby preventing it from providing wheel speed data to the main braking system altogether.

In the prior art, for addressing the above or other failure scenarios to provide accurate wheel speed data necessary for achieving precise brake control in redundant braking systems, the following two approaches are commonly employed: In the first approach, additional redundant wheel speed sensors are installed at the wheels, coupled with the redundant braking system, to provide redundant wheel speed data to the redundant braking system. In the second approach, the original single-output channel wheel speed sensor (coupled only with the main braking system) is replaced with a dual-output channel wheel speed sensor (simultaneously coupled with both the main braking system and the redundant braking system), providing wheel speed data separately to main braking system and redundant braking system.

However, the above two solutions in the prior art significantly increase hardware costs. For example, the first solution involves additional installation of a redundant set of wheel speed sensors for the redundant braking system.

Similarly, the double-output channel wheel speed sensor in the second solution involving addition and change in hardware, which incurs unexpected cost increases. Additionally, the new wheel speed sensors would entail additional research and development costs, potentially necessitating redesigns of vehicle components such as steering knuckles. Therefore, there is a need for a cost-effective and easily implementable solution to address the failure scenarios of the main braking system or wheel speed sensors, ensuring braking capability through the redundant braking system.

SUMMARY

A disclosure aims to provide a method and apparatus for braking vehicles using a redundant braking system without requiring any hardware additions or changes. Instead, it utilizes the electronic control unit of the redundant braking system to calculate wheel speed based on motor speed. This approach ensures accurate braking control of the vehicle through the redundant braking system in the event of failure of the main braking system or wheel speed sensors.

According to one aspect of the present disclosure, a method is provided for braking a vehicle using a redundant braking system, comprising: In response to a fault signal received from the main braking system of the vehicle, obtaining the motor speed Vm; calculating the wheel speed v of the vehicle based on the motor speed Vm; generating a braking command based on the wheel speed v to control the braking actuators of the vehicle to brake the wheels.

According to another aspect of the present disclosure, a device is provided for braking a vehicle using a redundant braking system, comprising: a memory; and a control unit. The control unit is coupled with a memory and configured to execute the method according to any one of the examples disclosed herein.

According to yet another aspect of the present disclosure, a computer-readable medium is provided. The computer-readable medium stores a computer program comprising instructions that, when executed by the control unit, configure the control unit to execute any of the methods according to various examples of the present disclosure.

BRIEF DESCRIPTION OF THE DRAWINGS

The various examples of the subject matter to be protected are described by way of typical examples with reference to the accompanying drawings. The same reference numbers are used in different accompanying drawings to denote the same or similar components.

DETAILED DESCRIPTION

In the following description, numerous specific details are set forth to provide a thorough understanding of the examples of the present disclosure. However, those skilled in the relevant art will recognize that the disclosure can be practiced without one or more of the specific details, or by using alternative methods, components, etc., to practice the disclosure. In some instances, well-known structures and operations are not shown or described in detail to avoid unnecessarily obscuring the present disclosure.

As discussed in the background technology section above, in vehicles utilizing both main braking systems and redundant braking systems (e.g., autonomous vehicles), the following failure scenarios may occur: The main braking system failure prevents accurate braking control, and simultaneously, the inability to transmit wheel speed data provided by the wheel speed sensors to the redundant braking system results in the redundant system being unable to act as a substitute for the main braking system to fulfill braking functions. Furthermore, the wheel speed sensor itself may also malfunction, thereby preventing it from providing wheel speed data to the main braking system altogether.

Figure 1A:
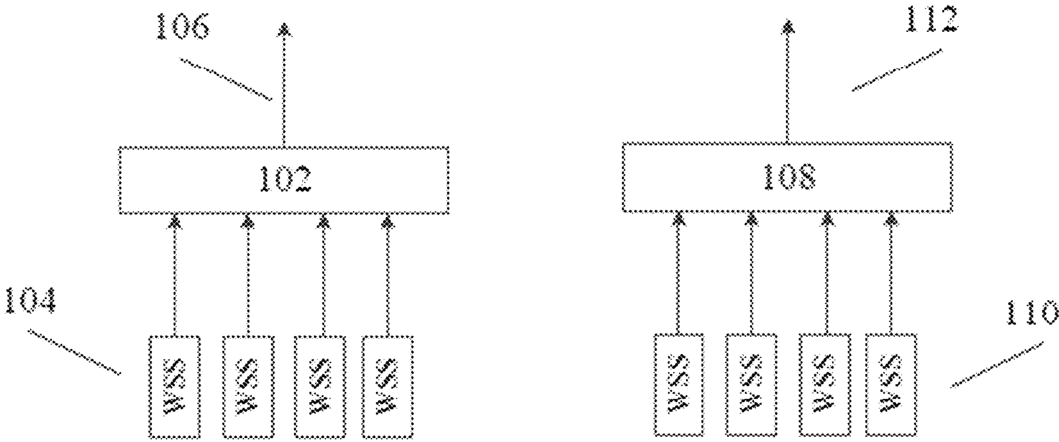
FIG. 1A-1B show schematic diagrams of the principles of two solutions for providing wheel speed data to redundant brake systems in the prior art.
Figure 1B:
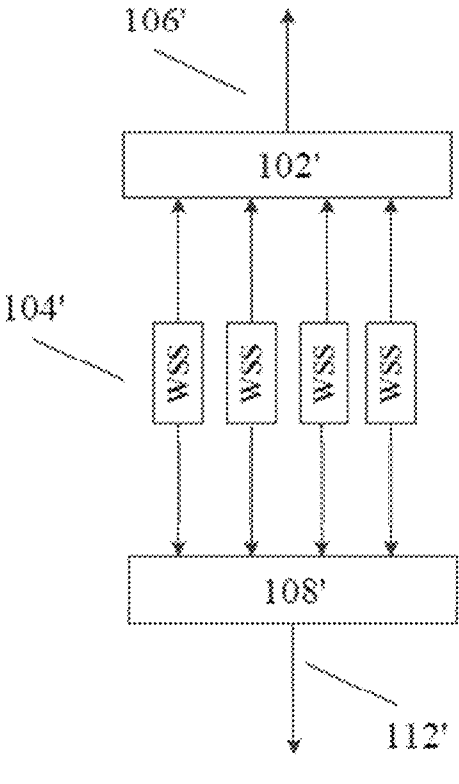

In the prior art, for addressing the above or other failure scenarios to provide accurate wheel speed data necessary for achieving precise brake control in redundant braking systems, two approaches are commonly employed. FIG. 1A-1B show schematic diagrams of the principles of two solutions for providing wheel speed data to redundant brake systems in the prior art.

As shown in FIG. 1A, in the first scenario, the main brake system 102 may couple with four existing wheel speed sensors (WSSs) 104 to obtain wheel speed data. The main brake system 102 may generate the brake command 106 based at least on wheel speed data provided by the existing wheel speed sensor 104 for implementing a brake on the vehicle. Further, FIG. 1A also illustrates that four redundant wheel speed sensors 110 may be added and coupled to the redundant brake system 108 to provide redundant wheel speed data to the redundant brake system 108. In this way, in the event of a failure in the main braking system 102 or a wheel speed sensor 104 coupled to the main braking system 102, the redundant braking system 108 can generate a braking command 112 based at least on the redundant wheel speed data provided by the redundant wheel speed sensor 110, so as to achieve braking of the vehicle in the event of a failure in the main braking system.

FIG. 1B shows a second solution for providing wheel speed data to a redundant braking system in the prior art. As shown in FIG. 1B, the wheel speed sensor 104' is changed into a dual-output channel wheel speed sensor, which can be coupled to the main braking system 102' and the redundant braking system 108' simultaneously through two independent output channels to provide wheel speed data to the main braking system 102' and the redundant braking system 108' respectively. In this way, when the main braking system 102' fails and cannot generate the braking command 106', the redundant braking system 108' can generate the braking command 112' using the wheel speed data provided through another output channel, thereby achieving braking of the vehicle.

However, the above two solutions in the prior art as shown in FIG. 1A-1B significantly increase hardware costs. For example, the first solution involves add a redundant set of wheel speed sensors 110 for the redundant braking system. Similarly, the double-output channel wheel speed sensor 104' in the second solution involving addition and change in hardware, which incurs unexpected cost increases. Additionally, the new wheel speed sensors would entail additional research and development costs, potentially necessitating redesigns of vehicle components such as steering knuckles.

To this end, the present disclosure provides a method and apparatus for braking vehicles using a redundant braking system without requiring any hardware additions or changes. Instead, it utilizes the electronic control unit of the redundant braking system to calculate wheel speed based on motor speed. This approach ensures accurate braking control of the vehicle through the redundant braking system in the event of failure of the main braking system or wheel speed sensors.

First, an exemplary working principle of a main braking system or a redundant braking system is described with reference to FIG. 2. For ease of understanding, examples of the main braking system may include, but are not limited to, electronic body stability systems (ESP, ESC, VSC, VSM), vehicle dynamic control systems (VDC), dynamic stability control systems (DSC), dynamic stability traction control systems (DSTC), active stability control systems (ASC), and the like as known to those skilled in the art. Examples of redundant braking systems may include, but are not limited to, electronic brake boosters, intelligent decoupling control systems (DPBs), and the like. Furthermore, the concepts of main braking system and redundant braking system may be used interchangeably. The two functions work together so that if either brake system fails, the other brake system can respond quickly to provide accurate braking control, thereby ensuring safe driving, for example, allowing the vehicle to park safely and smoothly by the side of the road.

Figure 2:
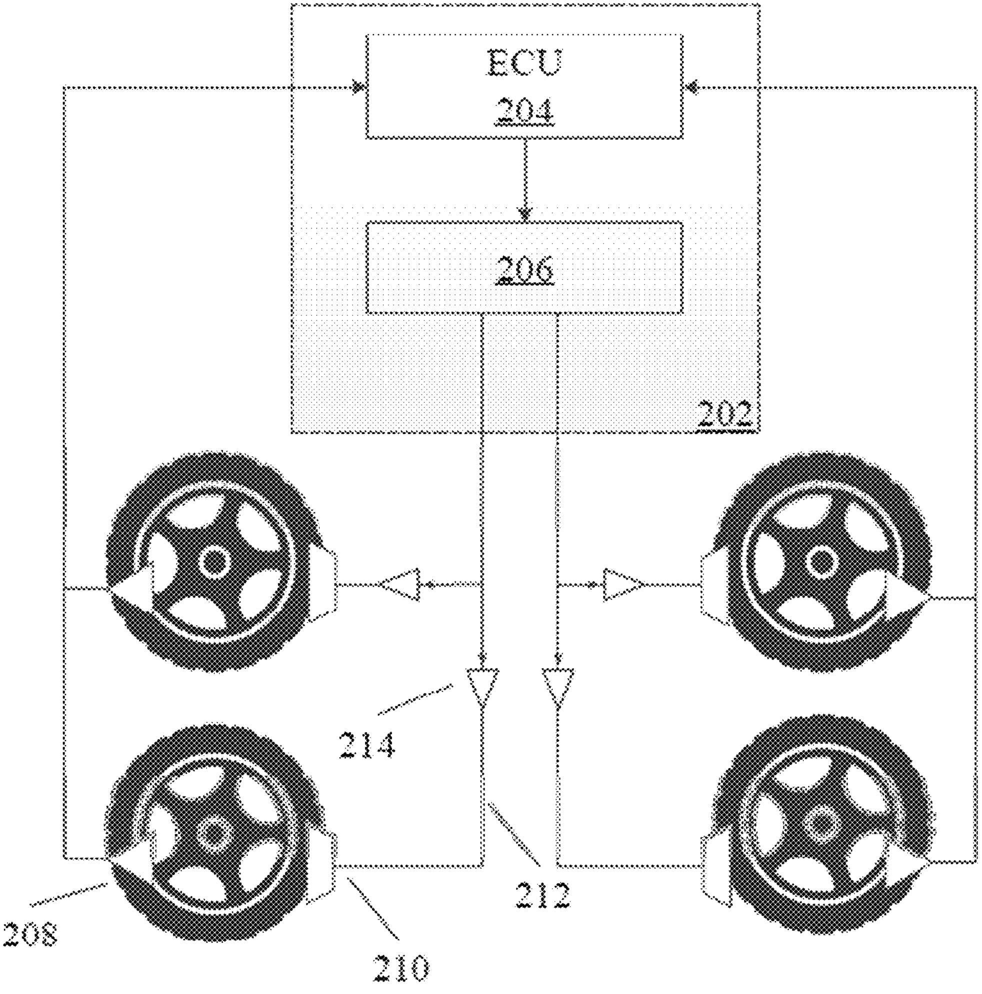
FIG. 2 shows a schematic diagram of an example operating principle of a main or redundant brake system, according to one example of the present disclosure.

As shown in FIG. 2, the brake system 202 includes an electronic control unit (ECU) 204 and a hydraulic pressure adjustment unit 206. Wheel speed sensors 208 attached at each wheel may provide wheel speed signals to the ECU 204 of the braking system 202. The ECU 204 may generate a braking command based at least on the wheel speed signal and transmit the braking command to the hydraulic pressure regulating unit 206. The hydraulic adjustment unit 206 is used to distribute the magnitude of the brake hydraulic pressure to be applied to each wheel via the corresponding hydraulic line (e.g., hydraulic line 212) based on the braking command, and to deliver a corresponding amount of brake fluid in the hydraulic master cylinder to the corresponding hydraulic line (e.g., hydraulic line 212) through a hydraulic pump. Each hydraulic line (e.g., hydraulic line 212) includes a plurality of solenoid valves (e.g., solenoid valve 214), and each solenoid valve may be a pressure boosting valve or a pressure limiting valve. By controlling the opening and closing of each solenoid valve in the corresponding hydraulic pipeline, or adjusting the opening size of each solenoid valve, the size of the brake hydraulic pressure acting on each wheel can be controlled and adjusted. A brake actuator (e.g., brake actuator 210) located at each wheel can brake the wheel under the action of brake hydraulic pressure. The brake actuator may be a brake caliper mounted on a brake disc, which may be clamped toward the wheel to achieve deceleration/braking of the vehicle through friction between the brake pad and the brake disc.

It should be noted that, in order to make the drawing clear, in FIG. 2, only the wheel speed sensor 208, brake actuator 210, hydraulic line 212 and solenoid valve 214 associated with one wheel are marked with reference number. However, it should be understood that such reference number apply equally to the other several wheels.

Figure 3:
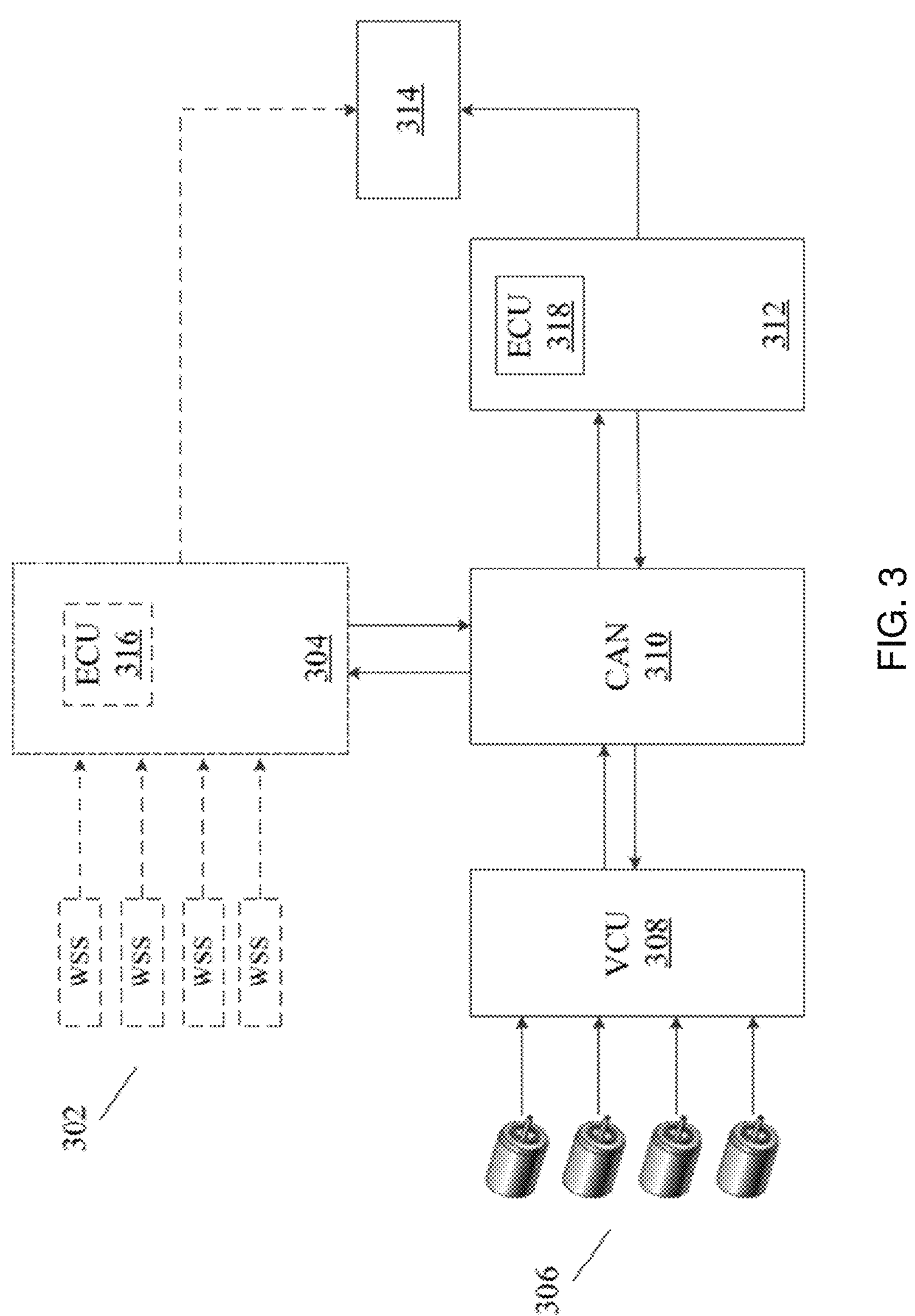
FIG. 3 illustrates a schematic diagram of an example composition of an overall brake system and interaction between the various subsystems/components therein, according to one example of the present disclosure.

FIG. 3 illustrates a schematic diagram of an example composition of an overall brake system and interaction between the various subsystems/components therein, according to one example of the present disclosure.

As shown in FIG. 3, the overall braking system of the vehicle includes the main braking system 304, the vehicle control unit (VCU) 308, and the redundant braking system 312, all of which are coupled to a CAN bus unit 310 and implement bidirectional communication with the CAN bus unit 310. FIG. 3 also shows a wheel speed sensor 302 coupled to a main brake system 304, a resolver sensor 306 coupled to a redundant brake system 312, and a brake actuator 314. It should be noted that in order to make the drawing clear, FIG. 3 only shows some subsystems/components and example structures of the vehicle's overall braking system. Those skilled in the art should understand that the vehicle's overall braking system also includes other subsystems/components that are not shown or structures that are different from the structures shown. Among them, for the main brake system 304 and the redundant brake system 312, only the subcomponents ECU 316 and ECU 318 are shown, and other subcomponents and structures (for example, the hydraulic adjustment unit, hydraulic pipelines, etc. discussed with reference to FIG. 2) are not shown in FIG. 3 for clarity.

As shown in FIG. 3, and in conjunction with the example working principles of the brake system discussed for FIG. 2, the ECU 316 of the main brake system 304 may receive wheel speed data from the wheel speed sensor 302 attached to each wheel and generate a brake command based on the wheel speed data to achieve a brake on the wheel by the brake actuator 314.

When using the main braking system 304 to achieve braking functions, the following failure scenarios may occur: If the main braking system 304 fails to achieve accurate braking control and cannot transmit wheel speed data provided by the wheel speed sensors 302 to the redundant braking system 312, this situation prevents the redundant braking system 312 from serving as a backup to complete braking functions in place of the main braking system 304. Alternatively, if the wheel speed sensors 302 themselves fail, it results in the inability to provide wheel speed data to the main braking system 304. The potential faults that may occur in the main braking system 304 can include power supply failure, hardware damage, software malfunction, and various other faults understood by those skilled in the art that could prevent the main braking system from performing the required braking functions. Thus, in the event of a fault in the main braking system 304 or if the main braking system 304 determines that one or more wheel speed sensors 302 coupled with it have malfunctioned, the ECU 316 of the main braking system 304 can send a fault signal to the redundant braking system 312 via the CAN bus unit 310. This fault signal informs the redundant braking system 312 of the fault in the main braking system 304 or one or more wheel speed sensors 302 and instructs the redundant braking system 312 to take over the braking function.

The redundant braking system 312, upon receiving the aforementioned fault signal from the main braking system 304, can obtain the motor speed Vm from the VCU 308 via the CAN bus unit 310. VCU 308 is the core electronic control unit used for implementing vehicle control decisions.

The motor speed Vm can be provided by the resolver sensor 308. The resolver sensor can be deployed in the powertrain units of hybrid and electric vehicles. Specifically, the magnetic coupling between the main winding and the two secondary windings of the resolver sensor varies according to the position of the rotating component (e.g., a rotor mounted on the motor shaft), thereby providing precise shaft rotation data. As shown in FIG. 3, the resolver sensor 306 can provide the corresponding motor speed Vm and output it to the VCU 308. It should be understood that, in one example, the signal output by the resolver sensor 306 may not be directly used as the motor speed Vm. Instead, further signal processing (e.g., analog-to-digital conversion) may be required to convert this output signal into a motor speed Vm that can be used by the redundant braking system 312. Such signal processing is known to those skilled in the art, and therefore is not shown in FIG. 3, nor will it be described in detail herein.

Next, the ECU 318 of the redundant braking system 312 can calculate the wheel speed v based on the motor speed Vm. User can obtain the wheel speed v by multiplying the motor speed Vm by the transmission ratio i and the rolling circumference of the wheel C. That is, the wheel speed v may be calculated based on the following formula: $v=Vm*i*C$.

The rolling circumference of a wheel is typically fixed for a specific vehicle and can be obtained through testing or calculated based on other parameters such as the rolling radius. The value of the rolling circumference of the wheel may generally be stored in memory of a control unit (e.g., VCU, ECU) of the vehicle.

The transmission ratio coefficient represents the ratio of the speeds of the front and rear transmission mechanisms of the vehicle's reducer. The above transmission ratio coefficient i values can depend on the model of the vehicle's reducer. In other words, the transmission ratio coefficient values for specific models of reducers are fixed. As such, in one example, the redundant braking system 312 can obtain the transmission ratio coefficient i value from VCU 308 via the CAN bus unit 310, or the transmission ratio coefficient i value can also be stored in the memory of ECU 318.

Additionally, in some electric or hybrid vehicles, the transmission includes multiple gears where the value of the transmission ratio coefficient i corresponds to each gear position. Each gear position and its corresponding transmission ratio coefficient i value can be stored in the vehicle's control unit memory (e.g., VCU, ECU) in the form of a table or other data structure. In this case, in one example, the redundant braking system 312 can determine the transmission ratio coefficient i value based on the gear position of the transmission when it receives a fault signal from the main braking system 304. For example, after receiving the aforementioned fault signal, VCU 308 can provide redundant braking system 312 with the transmission ratio coefficient i value corresponding to the current gear position of the transmission. Alternatively, the current gear position information can be provided by VCU 308 to redundant braking system 312, and redundant braking system 312 can determine the transmission ratio coefficient i based on this gear position information using its ECU 318.

In one example, the vehicle can include four independently controlled motors (not shown in FIG. 3). In this scenario, the four resolver sensors 306 can be installed paired with each of the four independently controlled motors, providing speed information specific to each corresponding motor. The four resolver sensors may therefore each provide: left front wheel motor speed Vm_FL, right front wheel motor speed Vm_FR, left rear wheel motor speed Vm_RL, and right rear wheel motor speed Vm_RR.

The ECU 318 of the redundant brake system 312 may further calculate the respective wheel speed at the four wheels based on the following equation, i.e., the left front wheel speed v_FL, the right front wheel speed v_FR, the left rear wheel speed v_RL, and the right rear wheel speed v_RR:

$$v\_FL = Vm\_FL * i * C$$

$$v\_FR = Vm\_FR * i * C$$

$$v\_RL = Vm\_RL * i * C$$

$$v\_RR = Vm\_RR * i * C,$$

where i and C are the drive ratio coefficients discussed above and the rolling circumference of the wheels, respectively.

Based on the computed wheel speed v, the ECU 318 of the redundant braking system 312 can generate braking commands to control the brake actuators 314, thereby achieving corresponding braking for each wheel. As discussed above with reference to FIG. 2, the ECU 318 may generate a brake command for the hydraulic adjustment unit. The hydraulic control unit allocates the hydraulic pressure size based on the braking command to be applied through corresponding hydraulic lines at each wheel. It achieves this by transporting an appropriate amount of brake fluid from the hydraulic pump to the respective hydraulic lines in the master cylinder. This control and adjustment of the hydraulic pressure applied to each wheel are accomplished by opening or closing the respective electromagnetic valves in the hydraulic lines or adjusting their aperture size. At each wheel, the brake actuator (e.g., brake caliper) 314 can use hydraulic pressure to engage the brake pads against the brake disc, creating friction that slows down or stops the vehicle smoothly and safely, enabling the vehicle to park securely.

Please note that while FIG. 3 specifically shows four resolver sensors paired with four independently controlled motors (not shown), the disclosed method of braking a vehicle using redundant braking systems is not limited to this particular powertrain configuration with four independently controlled motors. It is equally applicable to other powertrain configurations. For example, in an application scenario where one motor drives the front wheels and another motor drives the rear wheels, the resolver sensors installed paired with each motor can provide the motor speed specific to that corresponding motor, and the redundant braking system can calculate the wheel speed of the two front/rear wheels driven by that motor based on the respective motor speed.

Figure 4:
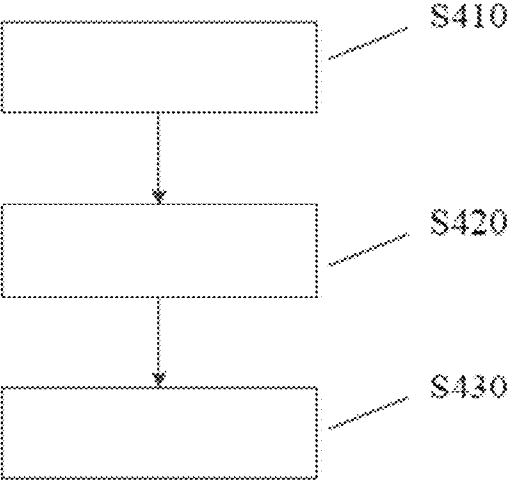
FIG. 4 illustrates a flowchart of a method of braking a vehicle via a redundant braking system, in accordance with one example of the present disclosure.

FIG. 4 illustrates a flowchart of a method of braking a vehicle via a redundant braking system, in accordance with one example of the present disclosure.

In step S410, in response to receiving a fault signal from the vehicle's main braking system, the redundant braking system can obtain the motor speed Vm. Wherein the fault signal is sent by the main braking system in response to a fault occurring in the main braking system and/or a wheel speed sensor coupled to the main braking system.

In step S420, the ECU of the redundant braking system can calculate the wheel speed v of the vehicle based on the motor speed Vm. The wheel speed v can be calculated by multiplying the motor speed Vm with the transmission ratio coefficient i and the rolling circumference of the wheel C. In one example, the value of the transmission ratio coefficient i can be determined based on the model of the gearbox of the vehicle. In another example, when the gearbox includes multiple gears, the redundant braking system can determine the value of the transmission ratio coefficient i based on the gear position of the gearbox when the fault signal is received. The motor speed Vm can be provided by the resolver sensors. In which, in application scenarios where the vehicle includes four independently controlled motors, the four resolver sensors can be paired and installed with each of the four independently controlled motors to provide speed information for each respective motor. The four resolver sensors may therefore each provide: left front wheel motor speed Vm_FL, right front wheel motor speed Vm_FR, left rear wheel motor speed Vm_RL, and right rear wheel motor speed Vm_RR. Further, the left front wheel speed v_FL, the right front wheel speed v_FR, the left rear wheel speed v_RL, and the right rear wheel speed v_RR can be calculated according to the formula:

$$v\_FL = Vm\_FL * i * C$$

$$v\_FR = Vm\_FR * i * C$$

$$v\_RL = Vm\_RL * i * C$$

$$v\_RR = Vm\_RR * i * C.$$

In step S430, the ECU of the redundant braking system can generate brake commands based on the wheel speed v to control the brake actuators of the vehicle for braking the wheels. Specifically, the ECU of the redundant braking system can generate brake commands that instruct the hydraulic control unit to allocate the appropriate amount of brake fluid pressure via respective hydraulic lines to each wheel for braking purposes. At each wheel, the brake actuator (e.g., brake caliper) can use hydraulic pressure to engage the brake pads against the brake disc, creating friction that slows down or stops the vehicle smoothly and safely, enabling the vehicle to park securely.

Figure 5:
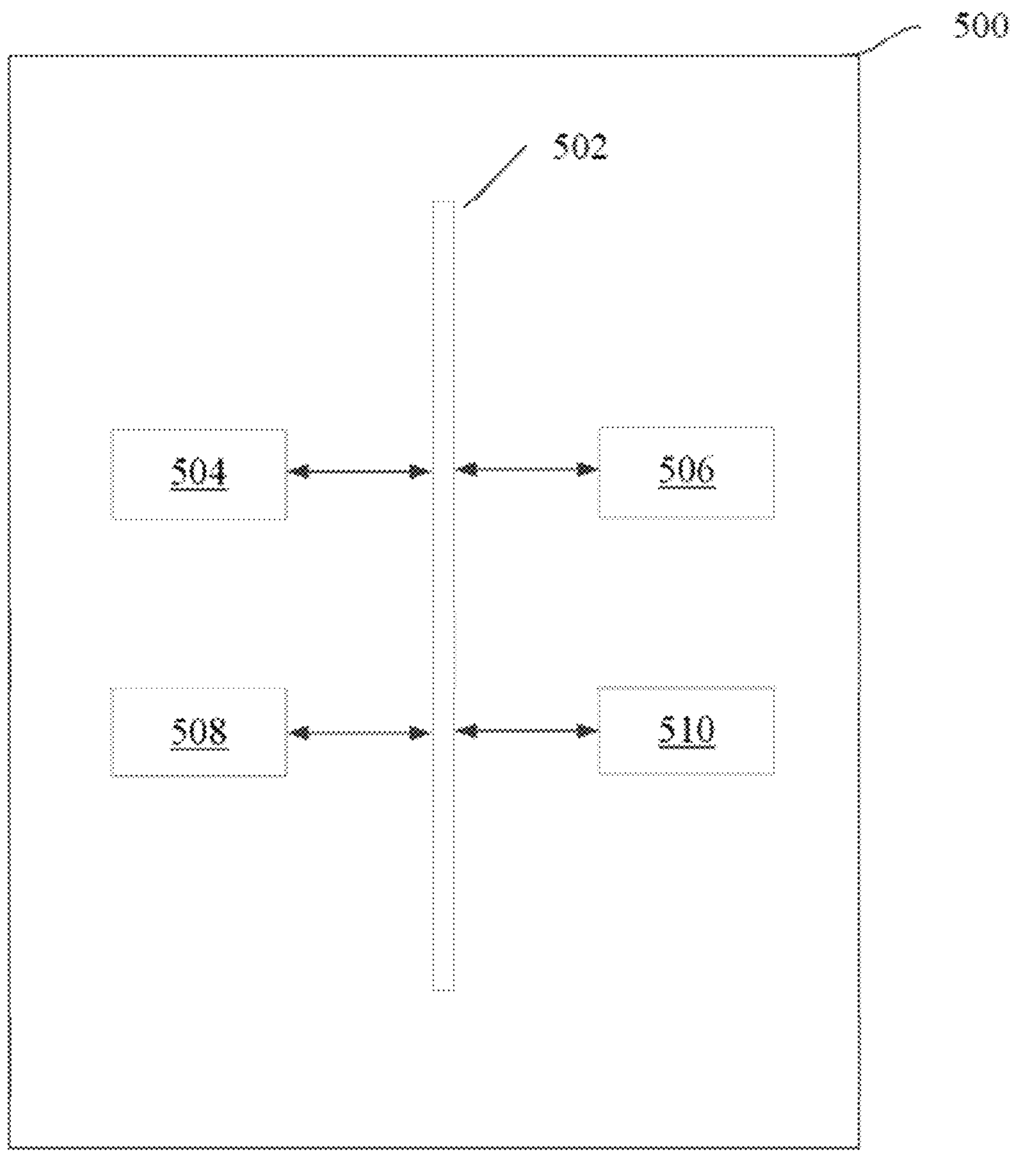
FIG. 5 illustrates a block diagram of an apparatus that may be used to implement a method of braking a vehicle via a redundant braking system, in accordance with one example of the present disclosure.

FIG. 5 illustrates a block diagram of an apparatus 500 that may be used to implement a method of braking a vehicle via a redundant braking system, in accordance with one example of the present disclosure. In one example, the apparatus 500 may include an electronic control unit (ECU) for the vehicle, such as ECU 204 discussed above with reference to FIG. 2, or ECU 318 of the redundant braking system 312 discussed with reference to FIG. 3, and so on.

The example apparatus 500 includes a control unit 504 connected to an internal communication bus 502. The control unit 504 is configured to execute instructions from memory 506 to implement the method described above for braking a vehicle using a redundant braking system. Examples of the control unit 504 may comprise a central processing unit (CPU), a microcontroller, etc. The memory 506, which is suitable for tangibly embodying computer program instructions and data, include various forms of storage such as EPROM, EEPROM, flash memory devices, and the like. The apparatus 500 may further include an input interface 508 and an output interface 510. Input interface 508 is used to receive input signals and data, including indications of main brake system failure from the main brake system (e.g., main brake system 304 as shown in FIG. 3), and/or fault signals indicating failure of wheel speed sensors coupled with the main brake system (e.g., wheel speed sensor 302 as shown in FIG. 3). Output interface 510 is used to send output signals and data, such as brake commands generated based on wheel speed v, to hydraulic adjustment units.

The computer program may comprise instructions executable by the computer to enable the control unit 504 of the apparatus 500 to perform a method of the present disclosure for braking the vehicle through a redundant braking system. The program may be recorded on any data storage medium, including memory. For example, the program may be implemented in digital electronic circuits or using computer hardware, firmware, software, or a combination thereof. The process/method steps described in this disclosure can be performed by a programmable processor executing program instructions to operate on input data and generate output to perform the method steps, processes, operations.

In addition to the content described in this document, various modifications can be made to the disclosed examples and examples of the present disclosure without departing from the scope of the disclosed examples and examples of the disclosure. Therefore, the description and examples herein should be interpreted as illustrative and not restrictive. The scope of the present disclosure should only be determined by reference to the claims.

What is claimed is:

1. A method for braking a vehicle using a redundant braking system, the vehicle including a motor, a transmission operably connected to the motor, a main braking system, braking actuators, and wheels, the method comprising:

receiving a fault signal from the main braking system;

obtaining a motor speed of the motor from a resolver sensor operably connected to the motor in response to receiving the fault signal;

determining a gear position of a plurality of gear positions of the transmission in response to receiving the fault signal;

calculating a wheel speed of the vehicle based on the motor speed and the gear position; and generating a braking command based on the wheel speed to control the braking actuators to brake the wheels.

2. The method according to claim 1, wherein calculating the wheel speed based on the motor speed and the gear position further comprises multiplying the motor speed by a drive ratio coefficient and a rolling circumference of the wheels.

3. The method according to claim 2, further comprising:

determining a model number of a decelerator of the vehicle; and determining a value of the drive ratio coefficient based on the model number.

4. The method according to claim 1, wherein the fault signal is issued by the main braking system in response to the main braking system failing and/or a wheel speed sensor coupled with the main braking system failing.

5. A method for braking a vehicle through a redundant braking system, including:

a memory; and a control unit which is coupled to the memory, the control unit being configured for performing the method according claim 1.

6. A non-transitory computer readable medium storing a computer program comprising instructions, wherein the instructions when executed by a control unit causes the control unit to be configured to perform the method according to claim 1.

7. The method according to claim 1, wherein:

each gear position of the plurality of gear positions corresponds to a different transmission ratio of a plurality of transmission ratios of the transmission, and the wheel speed is calculated based on the motor speed a corresponding transmission ratio of the gear position.

* * * * *